United States Patent
Kaminsky et al.

(10) Patent No.: US 10,102,489 B2
(45) Date of Patent: Oct. 16, 2018

(54) WORK PLAN BASED CONTROL OF PHYSICAL AND VIRTUAL ACCESS

(71) Applicant: International Business Machines Corporation, Armonk, NY (US)

(72) Inventors: David L. Kaminsky, Chapel Hill, NC (US); Lori M. Pilgrim, Ontario (CA); Govindaraj Sampathkumar, Cary, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 651 days.

(21) Appl. No.: 14/457,296

(22) Filed: Aug. 12, 2014

(65) Prior Publication Data

US 2016/0048787 A1    Feb. 18, 2016

(51) Int. Cl.
*G06Q 10/00* (2012.01)
*G06Q 10/06* (2012.01)

(52) U.S. Cl.
CPC .............. *G06Q 10/06314* (2013.01)

(58) Field of Classification Search
CPC ............................................. G06Q 10/06314
See application file for complete search history.

(56) References Cited

U.S. PATENT DOCUMENTS

| | | | |
|---|---|---|---|
| 6,965,876 B2* | 11/2005 | Dabbiere | G01S 5/0027 340/8.1 |
| 7,783,310 B2 | 8/2010 | Rana et al. | |
| 7,912,933 B2 | 3/2011 | Wright et al. | |
| 2002/0062451 A1* | 5/2002 | Scheidt | G06F 21/31 726/7 |
| 2003/0212887 A1* | 11/2003 | Walther | H04L 63/08 713/151 |
| 2006/0047555 A1* | 3/2006 | Kang | G06Q 10/10 705/7.26 |
| 2006/0265397 A1* | 11/2006 | Bryan | G06F 17/3089 |

(Continued)

FOREIGN PATENT DOCUMENTS

WO    2010020296 A1    2/2010

OTHER PUBLICATIONS

"An Authorization Framework using Building Information Models.", N Skandhakumar, J Reid, E Dawson . . . — Computer . . . , 2012—search.ebscohost.com.*

(Continued)

*Primary Examiner* — Jonathan G Sterrett
(74) *Attorney, Agent, or Firm* — Garg Law Firm, PLLC; Rakesh Garg; Christopher K. McLane

(57) ABSTRACT

A method, system, and computer program product for work plan based access control are provided in the illustrative embodiments. For a portion of the work plan, a physical space is determined. Access to the physical space is used in a task in the portion. At least one workflow is initiated to determine whether to grant the access to the physical space. Responsive to the workflow granting the access to the physical space, the access to the physical space is configured for a first duration for a first user performing the task. Responsive to an indication of closing of the portion, the access to the physical space for the first duration for the first user performing the task is revoked.

12 Claims, 5 Drawing Sheets

(56) References Cited

U.S. PATENT DOCUMENTS

| | | | | |
|---|---|---|---|---|
| 2010/0077316 | A1* | 3/2010 | Omansky | G06Q 10/10 715/751 |
| 2013/0090965 | A1* | 4/2013 | Rivere | G06Q 10/06311 705/7.15 |
| 2013/0314210 | A1* | 11/2013 | Schoner | G06K 7/10366 340/8.1 |
| 2013/0339404 | A1* | 12/2013 | Chao | G06F 17/5009 707/821 |
| 2014/0007222 | A1* | 1/2014 | Qureshi | G06F 21/10 726/16 |
| 2014/0035726 | A1* | 2/2014 | Schoner | G06K 7/10366 340/8.1 |
| 2015/0019174 | A1* | 1/2015 | Kiff | G06Q 50/08 703/1 |

OTHER PUBLICATIONS

"Prox-RBAC: a proximity-based spatially aware RBAC" MS Kirkpatrick, ML Damiani, E Bertino—Proceedings of the 19th ACM . . . , 2011—dl.acm.org.*

STARBAC: Spatiotemporal role based access control S Aich, S Sural, AK Majumdar— . . . International Conferences On the Move to . . . , 2007—Springer.*

CT-RBAC: A temporal RBAC model with conditional periodic time K Ouyang, JBD Joshi—Performance, Computing, and . . . , 2007—ieeexplore.ieee.org.*

Context-aware adaptation of access-control policies A Samuel, A Ghafoor, E Bertino—IEEE Internet Computing, 2008—ieeexplore.ieee.org.*

Integrated Identity and Access Management Architectural Patterns www.redbooks.ibm.com/redpapers/pdfs/redp4423.pdf 1May 29, 2008.*

Adaptive solutions for access control within pervasive healthcare systems D Al Kukhun, F Sedes—International Conference on Smart Homes and . . . , 2008—Springer.*

A review and outlook for a 'Building Information Model' (BIM): A multi-standpoint framework for technological development T Cerovsek—Advanced engineering informatics, 2011—Elsevier.*

Maximo extensions for Building Information Models, Document Version 1.2, © 2011, Doug Wood & Paul Lacey.*

A role-based delegation model and some extensions E Barka, R Sandhu—23rd National Information Systems Security . . . , 2000—Citeseer.*

"Role based access control with spatiotemporal context for mobile applications". S Aich, S Mondal, S Sural, AK Majumdar—Trans. Computational Science, 2009—Springer.*

* cited by examiner

WORK PLAN BASED CONTROL OF PHYSICAL AND VIRTUAL ACCESS

TECHNICAL FIELD

The present invention relates generally to a method, system, and computer program product for securing physical and virtual assets. More particularly, the present invention relates to a method, system, and computer program product for work plan based control of physical and virtual access.

BACKGROUND

A physical space is an area or space in a physical location, such as in a building, on land, in a vessel, or in another type of structure in the physical world. Access to certain physical spaces is controlled or managed for a variety of reasons.

For example, buildings in the physical world have areas, floors, rooms, partitions, sections, layers, or other types of physical spaces configured with access control mechanisms. Different physical spaces in a building can have different levels of access. For example, restrooms and hallways are generally areas with general access to everybody who may wish to use those physical spaces.

Factory floors, engine rooms, server rooms, executive offices, are examples of physical spaces with some level of restriction on access. Additional restrictions are placed on physical spaces such as electrical control rooms, fire suppression closets, wiring cabinets, for highly restricted access. This type of access control is common in many office and commercial buildings including areas such as airports, factories, military facilities, and so on.

In the virtual world, building blueprints are captured as digital or virtual resources, such as in virtual Building Information Models (BIM). BIM captures the design of the structural elements of a physical space, such as a building, physical assets within the physical space, and one or more attributes of such structural elements and assets. For example, BIM of a building includes virtual representations of the piping and plumbing, the electrical wiring, the duct systems, and so on of a physical space.

SUMMARY

The illustrative embodiments provide a method, system, and computer program product for work plan based control of physical and virtual access. An embodiment includes a method for work plan based access control. The embodiment determines, at an application executing using a processor and a memory, for a portion of the work plan, a physical space a, wherein access to the physical space is used in a task in the portion. The embodiment initiates at least one workflow, the at least one workflow operating to determine whether to grant the access to the physical space. The embodiment configures, responsive to the workflow granting the access to the physical space, the access to the physical space for a first duration for a first user performing the task. The embodiment revokes, responsive to an indication of closing of the portion, the access to the physical space for the first duration for the first user performing the task.

Another embodiment includes a computer usable program product comprising a computer readable storage device including computer usable code for work plan based access control. The embodiment further includes computer usable code for determining, at an application executing using a processor and a memory, for a portion of the work plan, a physical space, wherein access to the physical space is used in a task in the portion. The embodiment further includes computer usable code for initiating at least one workflow, the at least one workflow operating to determine whether to grant the access to the physical space. The embodiment further includes computer usable code for configuring, responsive to the workflow granting the access to the physical space, the access to the physical space for a first duration for a first user performing the task. The embodiment further includes computer usable code for revoking, responsive to an indication of closing of the portion, the access to the physical space for the first duration for the first user performing the task.

Another embodiment includes a data processing system for work plan based access control. The embodiment further includes a storage device including a storage medium, wherein the storage device stores computer usable program code. The embodiment further includes a processor, wherein the processor executes the computer usable program code. The embodiment further includes computer usable code for determining, at an application executing using a processor and a memory, for a portion of the work plan, a physical space, wherein access to the physical space is used in a task in the portion. The embodiment further includes computer usable code for initiating at least one workflow, the at least one workflow operating to determine whether to grant the access to the physical space. The embodiment further includes computer usable code for configuring, responsive to the workflow granting the access to the physical space, the access to the physical space for a first duration for a first user performing the task. The embodiment further includes computer usable code for revoking, responsive to an indication of closing of the portion, the access to the physical space for the first duration for the first user performing the task.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
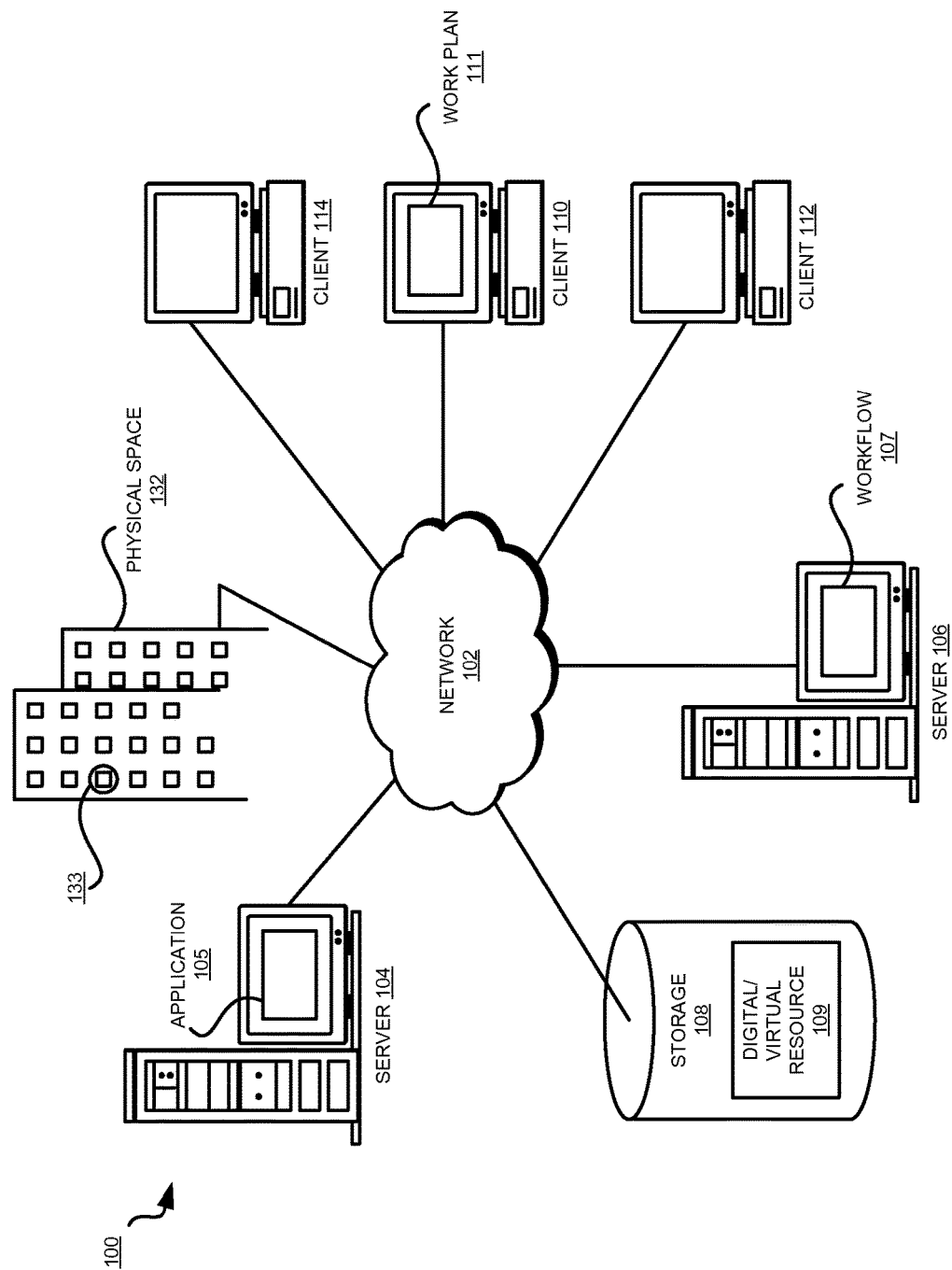
FIG. 1 depicts a block diagram of a network of data processing systems in which illustrative embodiments may be implemented.

The illustrative embodiments recognize that BIMs are becoming increasingly critical for managing physical spaces in the field of Smarter Infrastructure. Various governmental agencies and other entities currently require BIM, and many entities are beginning to mandate BIMs for new constructions and renovations.

A BIM is only described as an example of a virtual resource and is not intended to be limiting on the illustrative embodiments. Within the scope of the illustrative embodiments, a virtual resource corresponds to a bound and defined physical space. Examples of virtual resources include, but are not limited to, an electrical wiring diagram, a networking layout, an exit plan, an emergency response system configuration, a plumbing diagram, a power service diagram, a backup power network configuration, physical asset attributes (e.g., an HVAC system) and many other similarly purposed informational artifacts that can be stored in a digital or analog form in a data processing system.

A physical space may have any number of virtual resources associated therewith. For example, a building floor is an example of a physical space, which has an electrical wiring diagram, a networking layout, an exit plan, an emergency response system configuration, and many other virtual resources associated therewith.

Similarly, a virtual resource may correspond to more than one physical space. For example, a wiring diagram for a building floor (a physical space) is also applicable to an office (another physical space) on that floor.

The illustrative embodiments recognize that certain reasons for accessing a physical space also require access to one or more corresponding virtual resource. Consider an example, where an electrician needs to diagnose and repair an electrical wiring that flows through a restricted physical space and non-restricted physical space in a building. Before starting the work, the electrician would need to have adequate access to not only the physical spaces of varied access restrictions, but also to a repository of virtual resources, such as to access the electrical wiring information for those physical spaces.

As an example, if the repository includes a BIM for the building, the illustrative embodiments recognize that some virtual resources have to be separately access controlled in the BIM so that the Electrician can be given selective access to only those virtual resources that are to be used in the electrician's work plan.

A work plan comprises any plan, schedule, steps, procedure, problem-description, or other similarly purposed documentation of a task to be performed. A trouble ticket is an example of a work plan. A work-order is an example of a work plan. According to the illustrative embodiments, a work plan further comprises a specification of a duration within which the task is to be completed.

The illustrative embodiments recognize that for a work plan, the access to the physical and virtual resources has to be controlled in a duration-specific manner. For example, if the electrician's work plan lasts for two days, the access to the physical space as well as any associated virtual resources should be controlled such that the access is revoked when that two-day duration expires.

As another example, for the physical access to a work location, a route to that location from the public area or from another area may be needed, such as when security measures exist along the route. However, while granting access to the physical path is desirable, granting access to the virtual resources on the physical path to the work area may be undesirable.

The illustrative embodiments used to describe the invention generally address and solve the above-described problems and other problems related to controlling access to physical spaces and related virtual resources. The illustrative embodiments provide a method, system, and computer program product for work plan based control of physical and virtual access.

An embodiment associates physical spaces with virtual resources in the manner described in this disclosure. A physical space is uniquely identifiable in an embodiment using an identifier. The physical space is configured in the embodiment with one or more levels of accesses, e.g., ranging from open access to all, to highly restricted, or some variation thereof.

In a similar manner, a virtual resource is also uniquely identifiable in an embodiment using an identifier, and a virtual resource identifier is associated with a physical space identifier. The virtual resource is further configured in the embodiment with one or more levels of accesses, e.g., ranging from open access to all, to highly restricted, or some variation thereof. Logical grouping of physical spaces, logical grouping of virtual resources, or groupings of combinations of physical spaces and virtual resources can also be identified and access controlled in a similar manner.

When an embodiment receives a work plan, the embodiment determines a combination of physical spaces and virtual resources that are needed or likely to be needed for the work plan. The embodiment further determines a duration for which the combination is needed. For a physical space or virtual resource, a workflow comprising some combination of users and applications determines whether access to that physical space or virtual resource should be granted for the duration, location, route to the location for the duration, or a combination thereof.

Generally, access an embodiment is configurable or usable to enable or disable access to physical space, virtual resource, for a duration, location, route to the location, or a combination thereof. Where an embodiment is described with respect to one type of access, the embodiment is configurable or usable for controlling other types of accesses in a similar manner within the scope of the illustrative embodiments.

An embodiment triggers one or more workflows to obtain access to the physical space and associated virtual resources for the duration according to the work plan. Where the physical space or the virtual resource is not access controlled, the embodiment assumes that access is granted, and no workflow is triggered.

When the access permissions are granted, the worker(s) assigned to the work plan are granted access to the physical spaces and virtual resources. For example, an embodiment creates or enables badge access to the physical spaces and a "user ID/password" access, or certificate-based or other type of access to the virtual resources.

An embodiment can configure any suitable mechanism or process for access to physical spaces, virtual resources, or both. For example, mobile devices, such as smartphones carried by workers or a device work by the worker, can be configured or recognized to allow access to physical spaces as well as to virtual resources. Any suitable mechanism, device, technique, method, or process can be used in conjunction with an embodiment to control access to physical spaces and virtual resources without departing the scope of the illustrative embodiments.

An embodiment further accepts requests for additional access during the execution of the work plan. For example, the worker(s), while tracing an electrical problem can request additional access to a new physical space or a new virtual resource to diagnose or repair the problem. The embodiment triggers the appropriate workflows for obtaining the requested access.

An embodiment is usable to extend or modify an already-granted access during the execution of the work plan. For example, a task may require longer than planned to complete, requiring extended access to a physical space, virtual resource, or both. The embodiment triggers the appropriate workflows for obtaining extensions or modifications of access.

A work plan can be closed in a variety of manners. For example, the duration of the work plan can expire, the worker(s) assigned to the work plan close the work plan, or the work plan is terminated or modified by a user or process causing the work plan to close. When a work plan is closed, an embodiment revokes the access granted according to the work plan. If any access is available to a worker by default, the embodiment does not revoke such access.

A work plan may span several durations, and within each duration the access may be needed to different combinations of physical spaces and virtual resources. An embodiment progressively grants and revokes the accesses as one duration of the work plan elapses and the next duration of the work plan commences.

During such progressive access control, if consecutive durations use a common subset of physical spaces and/or virtual resources, an embodiment preserves the access to such subset from the elapsed duration into the next consecutive duration. Another embodiment revokes all accesses for an elapsed duration and grants new access permissions for the next consecutive duration regardless of any common subset of physical spaces and/or virtual resources between those consecutive durations.

The illustrative embodiments are described with respect to certain physical spaces, virtual resources, access levels, access permissions, work plans, durations, workflows, models, tools, rules, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
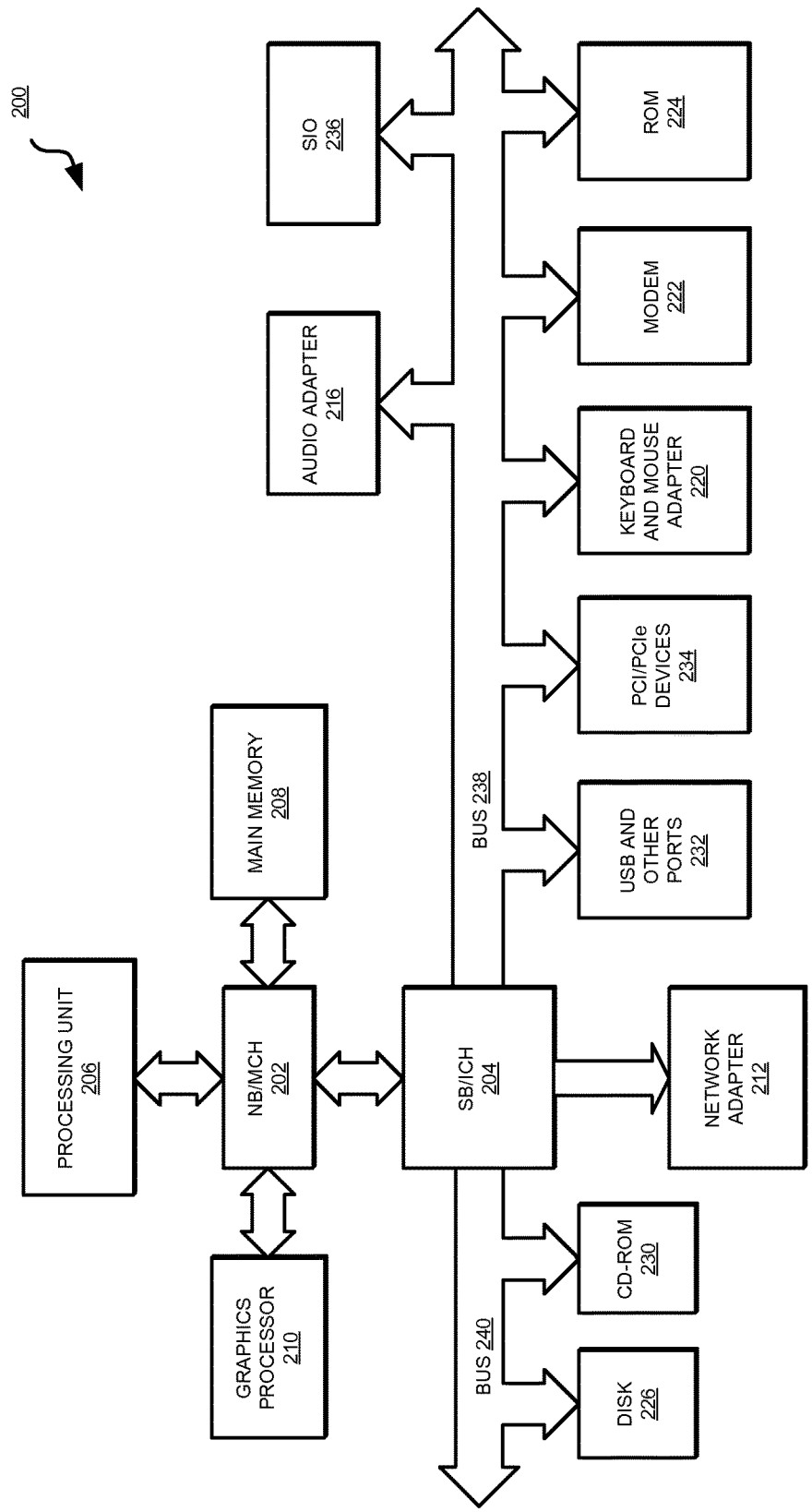
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Physical space 132 is any suitable type of physical space, including but not limited to a building or apportion thereof. Physical space 132 can have any number and types of other physical spaces configured therein. For example, physical space 133 in physical space 132 may be an office, a locker room, a secured area, a floor, or another type of partitioned physical space. Network 102 provides access to physical space 132 for configuring access to a physical space therein, such as by communicating with an access card reader or a biometric reader to allow access to physical space 133. Virtual resource 109 is one of any number of virtual resources in repository 108. Virtual resource 109 corresponds to a physical space, such as to physical space 132 or physical space 133. Application 105 implements an embodiment described herein. Workflow 107 is one example workflow amongst any number of workflows, and operates to grant or deny access to a physical space, such as physical space 133, or a virtual resource, such as virtual resource 109. Work plan 111 uses access to a combination of physical space 133 and virtual resource 109 to complete a task over one or more durations.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of other devices in which computer usable program code or instructions implementing the processes of the illustrative embodiments may be located. Data processing system 200 is described as a computer only as an example, without being limited thereto. Implementations in the form of other devices may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105, and workflow 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
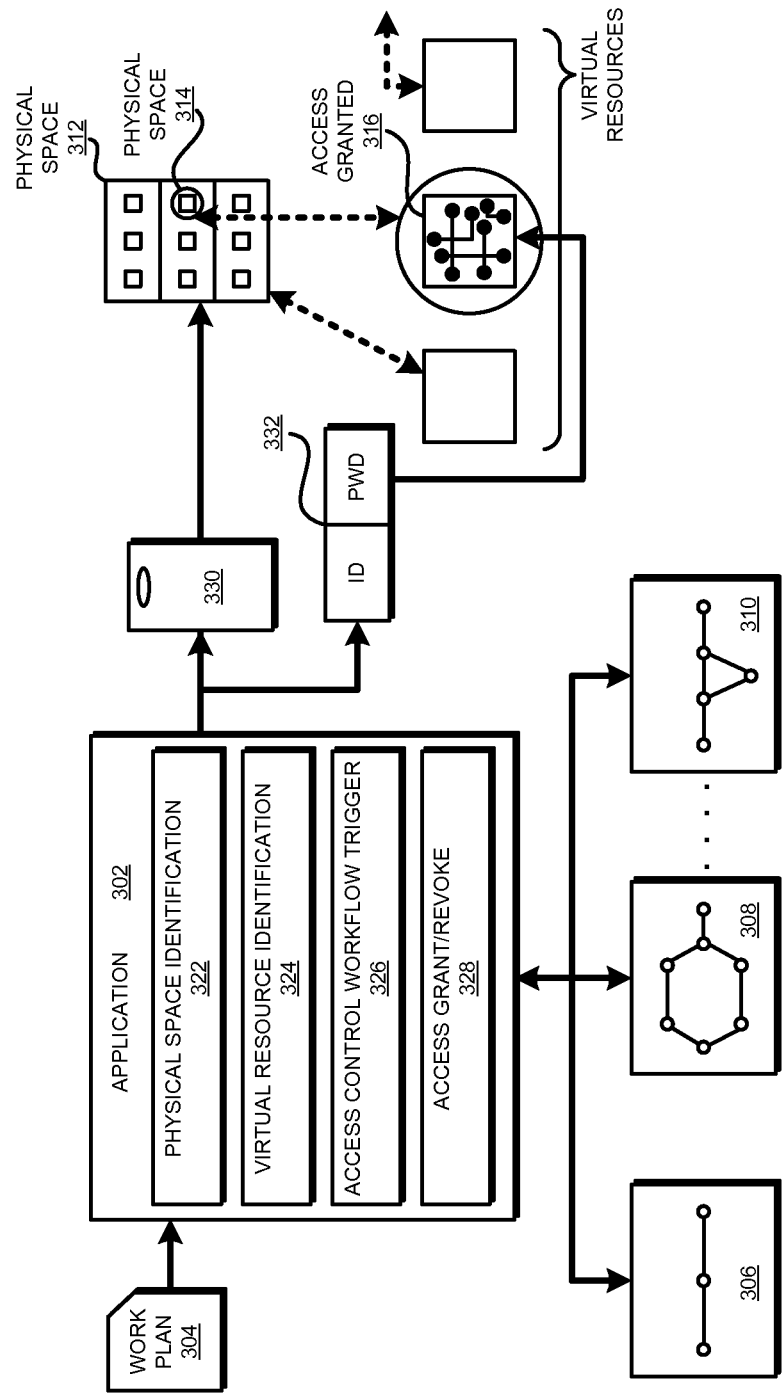
FIG. 3 depicts a block diagram of a configuration for work plan based control of physical and virtual access in accordance with an illustrative embodiment.

With reference to FIG. 3, this figure depicts a block diagram of a configuration for work plan based control of physical and virtual access in accordance with an illustrative embodiment. Application 302 is an example of application 105 in FIG. 1. Work plan 304 is an example of work plan 111 in FIG. 1. Workflows 306, 308, and 310 are different examples of workflow 107 in FIG. 1. Physical space 312 is an example of physical space 132 and physical space 314 is an example of physical space 133, respectively, in FIG. 1. Virtual resource 316 is an example of virtual resource 109 in FIG. 1.

When application 302 receives work plan 304, component 322 identifies one or more physical spaces used for completing all or a portion of a task over a duration. Component 324 identifies one or more virtual resources associated with the identified physical space and used for completing all or the portion of the task over the duration. When multiple task or task portions occupy multiple durations in work plan 304, component 322 and 324 similarly identify the various sets of physical spaces and virtual resources for the corresponding durations.

Some time prior to the duration when the task or task portion are to be performed, component 326 calls, triggers, or otherwise initiates one or more workflows from workflows 306, 308, and 310. For example, if the task uses physical space 314, component 326 determines that workflow 306 is responsible for making access determinations for physical space 314. Similarly, if the task uses virtual resource 316, component 326 determines that workflow 308 is responsible for making access determinations for virtual resource 316. In some cases, for a physical space and a virtual resource that are associated with one another, for example, as shown by the dotted double-sided arrow between physical space 314 and virtual resource 316, a common workflow, such as workflow 306 may make access determinations for the related physical space and the virtual resource.

Component 328 configures the access to the physical spaces and virtual resources used by the task or task portions for the duration. For example, component 328 receives an access determination result from workflow 306. If workflow 306 granted the access, component 328 configures access card 330, or a card reader at physical space 314, or both, such that a bearer of access card 330 gains access to physical space 314 for the duration. Similarly, component 328 receives an access determination result from a workflow virtual resource 318, such as from workflow 308 or workflow 306 as the case may be. If the responsible workflow granted the access, component 328 configures access control information 332, e.g., a user ID and password or other similarly purposed access control information, such that a worker associated with information 332 gains access to virtual resource 316 for the duration.

When the task or the task portion is complete, the duration has elapsed, or work plan 304 is closed by any suitable method, component 328 revokes access to physical space 314 and virtual resource 316. For example, component 328 configures access card 330, or a card reader at physical space 314, or both, such that a bearer of access card 330 can no longer gains access to physical space 314 after the revocation. Similarly, component 328 configures access control information 332 such that a worker associated with information 332 can no longer gain access to virtual resource 316 after the revocation.

Figure 4:
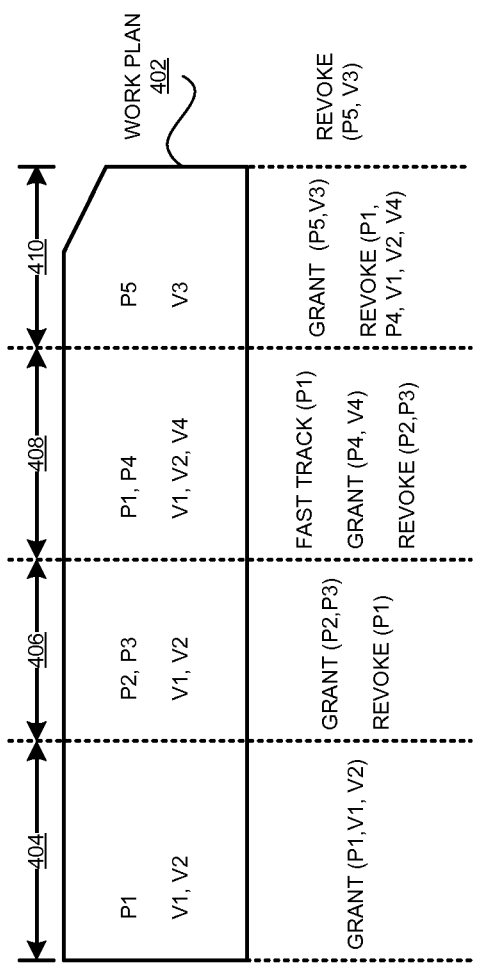
FIG. 4 depicts a block diagram of progressively managing access in accordance with an illustrative embodiment.

With reference to FIG. 4, this figure depicts a block diagram of progressively managing access in accordance with an illustrative embodiment. Work plan 402 is an example of work plan 304 in FIG. 3.

Assume, for example, that physical spaces P1, P2, P3, P4, and P5 are usable in a given physical world environment. The choreography between a physical space and a virtual resource can be one-to-one, many-to-one, one-to-many, or many-to-many. Assume, for example, that virtual resources V1, V2, V3, and V4 have some correspondence with physical spaces P1, P2, P3, P4, and P5.

Further assume, as an example, that work plan 402 comprises portions 404, 406, 408, and 410. Each portion may be a separate task or a separate portion of a larger single task that is to be performed under work plan 402.

An application, e.g., application 302 in FIG. 3, determines that portion 404 will need access to physical space P1, and corresponding virtual resources V1 and V2. Accordingly, the application invokes one or more access determining workflows to have access to P1, V1, and V2 granted. The application then enables access to P1, V1, and V2 for persons working on portion 404.

When portion 404 is closed by any method described herein, the application evaluates portion 406's access needs. The application determines that portion 404 will need access to physical spaces P2 and P3, and corresponding virtual resources V1 and V2. The application determines that access to V1 and V2 was granted for preceding portion 404 and can continue for portion 406 but access to P1 should not remain active during portion 406. Accordingly, the application revokes the access to P1, and invokes one or more access determining workflows to have access to P2 and P3 granted. The application then enables access to P2, P3, V1, and V2 for persons working on portion 406.

In some cases, access to combinations of physical spaces and virtual resources may have to be granted or revoked together. In some other cases, even if the physical space or the virtual resource remains the same from one portion to another, the persons accessing them may change. In such cases, while revoking access to P1 the application also revokes access to V1 and V2 when portion 404 is closed. The application has access to P2, P3, V1, and V2 granted for portion 406. The application then enables access to P2, P3, V1, and V2 for persons working on portion 406.

In some cases, a work plan, a person, or a combination thereof may have been granted access to a physical space or virtual resource, and the access was later revoked. When a new access to the same work plan, same person, or a combination thereof is needed for the same physical space or virtual resource, the application can select a modified workflow to re-granting access.

Consider for example, portion 406 has closed and portion 408 is about to become active. The application determines that portion 408 will need access to physical spaces P1 and P4, and corresponding virtual resources V1, V2, and V4.

The application determines that portion 408 seeks to regain access to physical space P1. Accordingly, the application invokes a modified workflow to fast-track or shorten the process of reauthorizing access to P1. Operating in a manner described earlier, the application determines that access to P2 and P3 should be terminated, and access to P4 and V4 should be granted. Accordingly, the application re-acquires access to P1, acquires access to P4 and V4, and terminates access to P2 and P3. The application then enables access to P1, P4, V1, V2, and V4 for persons working on portion 408.

Operating in a similar manner for portion 410, the application acquires access to physical space P5 and corresponding virtual resource V3, and terminates access to P1, P4, V1, V2, and V4. The application then enables access to P5 and V3 for persons working on portion 410.

Work plan 402 closes when all portions of the work plan are closed, such as when the last portion, portion 410, closes. When work plan 402 is closed, the application terminates access to P5 and V3 as well.

Figure 5:
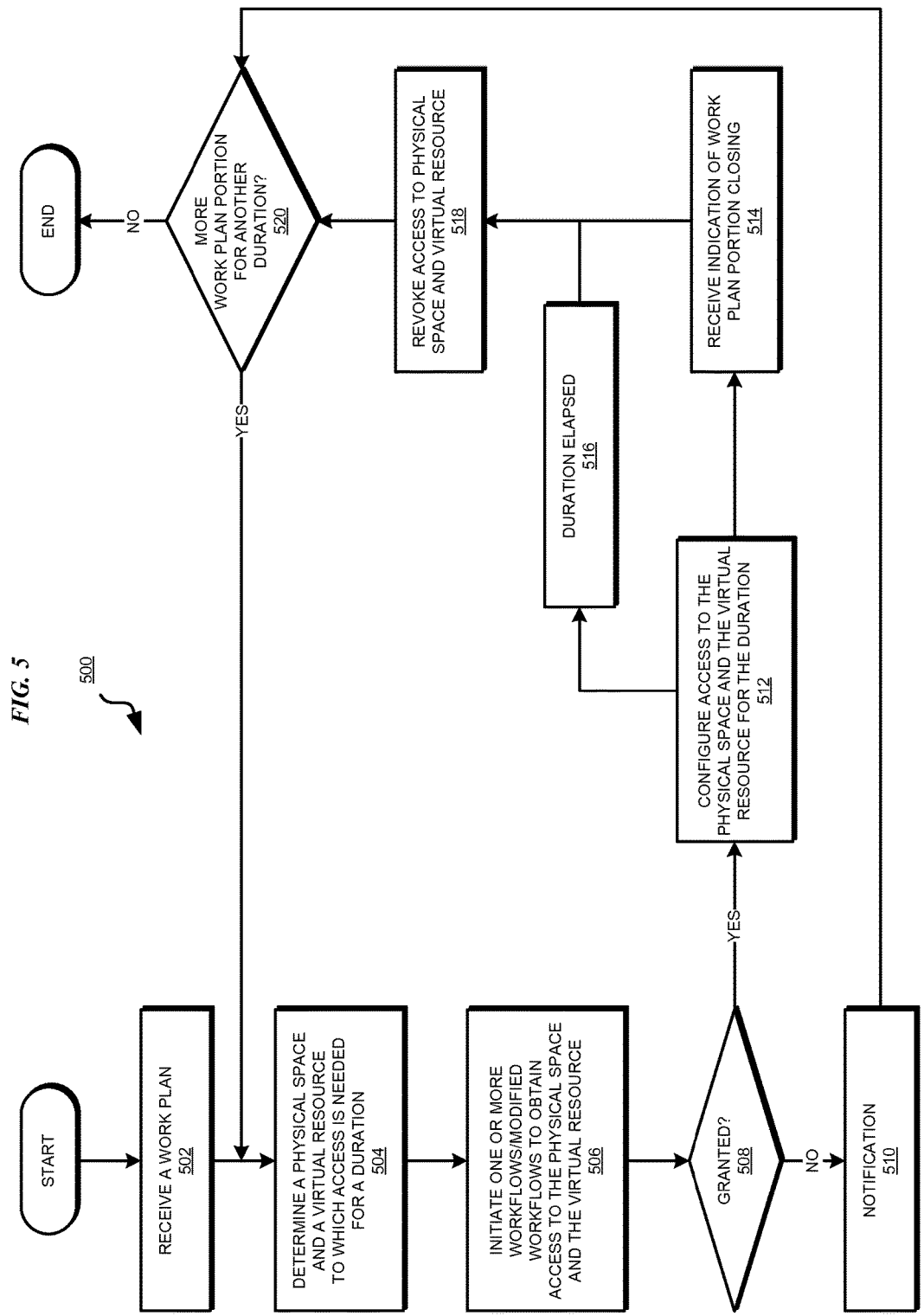
FIG. 5 depicts a flowchart of an example process for work plan based control of physical and virtual access in accordance with an illustrative embodiment.

With reference to FIG. 5, this figure depicts a flowchart of an example process for work plan based control of physical and virtual access in accordance with an illustrative embodiment. Process 500 can be implemented in application 302 in FIG. 3.

The application receives a work plan (block 502). The application determines at least one physical space and at least one related virtual resource to which access is needed for a duration according to the work plan or a portion thereof (block 504).

The application initiates one or more workflows or modified workflows to obtain or re-obtain access to the at least one physical space and the at least one related virtual resource (block 506). The application determines whether the requested accesses have been granted by the workflows (block 508). If one or more requested access is not granted by a workflow ("No" path of block 508), the application sends a notification about the declined access (block 510). The application ends process 500 thereafter. As an example, the application sends the notification of block 510 to a user who can take further actions to have the work plan executed.

If the requested access to the at least one physical space and the at least one related virtual resource is granted ("Yes" path of block 508), the application makes the at least one physical space and the at least one related virtual resource accessible for the duration to the persons associated with the work plan (block 512).

The application receives an indication of closing of the work plan or the portion that was using the at least one physical space and the at least one related virtual resource for the duration (block 514).

Alternatively or together with the indication of block 514, the application determines that the duration for which access to the at least one physical space and the at least one related virtual resource was granted has elapsed (block 516). Responsive to blocks 514, 516, or both, the application revokes access to the at least one physical space and the at least one related virtual resource (block 518). In some embodiments, the application may retain access to some physical space or virtual resource for continued use in subsequent portions of the work plan as described elsewhere in this disclosure.

The application determines whether more work plan portions remain to be evaluated for access management for another duration (block 520). If more work plan portions remain ("Yes" path of block 520), the application returns to block 504. If no more work plan portions remain ("No" path of block 520), the application ends process 500 thereafter.

Thus, a computer implemented method, system or apparatus, and computer program product are provided in the illustrative embodiments for work plan based control of physical and virtual access.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for work plan based access control, the method comprising:
    determining, at an application executing using a processor and a memory, for a portion of the work plan, a first physical space, wherein access to the first physical space is used in a task in the portion;
    forming, at the application executing using the processor and the memory, for the portion of the work plan, a first logical grouping using the first physical space and a first plurality of virtual resources related to the first physical space, wherein the first plurality of virtual resources is used in the task in the portion;
    initiating at least one workflow, the at least one workflow operating to determine whether to grant the access to the first logical grouping;
    configuring, responsive to determining that an access permission is needed to the first physical space, a mobile device of a first user, wherein the mobile device is going to be present in the first physical space with the access permission to the first physical space for a first duration for the first user performing the task;
    further configuring the mobile device such that the mobile device is recognized to provide access to the first plurality of virtual resources for the first duration for the first user performing the task;
    triggering a second workflow, responsive to determining that the portion requires longer than the first duration, to modify the access permission on the mobile device; and
    progressively changing the access permission on the mobile device, comprising:
        revoking, responsive to an indication of closing of the portion, the access to the first logical grouping for the first duration for the first user performing the task;
        determining, responsive to the closing of the portion, for a second portion of the work plan, a second logical grouping of a second physical space and a second plurality of virtual resources related to the second physical space, wherein the second physical space and the second plurality of virtual resources are used in a second task in the second portion, and wherein access to at least one of the first plurality of virtual resources is maintained during the revoking and included in the second plurality of virtual resources; and
        configuring, responsive to granting access to the second physical space, the access permission on the mobile device of the first user to access the second logical grouping for a second duration of the second task.

2. The method of claim 1, wherein the at least one workflow further operates to determine whether to grant the access to the virtual resource.

3. The method of claim 1, wherein the virtual resource is a part of a Building Information Model (BIM), wherein the BIM models a component of the physical space.

4. The method of claim 1, further comprising:
    determining, after revoking the access to the first physical space for the first duration, that the first user uses the first physical space in performing the second task for a second portion of the work plan;
    initiating a third workflow, the third workflow operating to determine whether to grant access to the first physical space, wherein the third workflow is shorter as compared to the at least one workflow in determining whether to grant access to the first physical space.

5. The method of claim 1, further comprising:
    initiating a third workflow, the third workflow operating to determine whether to grant access to the second physical space, wherein a route to the first physical space comprises the second physical space;
    configuring, responsive to the second workflow granting access to the second physical space, access to the second physical space but preventing access to the second virtual resource related to the second physical space for the first duration for the first user performing the task.

6. The method of claim 1, further comprising:
  determining for the portion of the work plan, that for the first duration for the first user performing the task has to be changed by an amount;
  initiating a third workflow, the third workflow operating to determine whether to change the first duration access to the first physical space by the amount; and
  changing the first duration by the amount, responsive to the third workflow authorizing the change.

7. A non-transitory computer usable program product comprising a computer readable storage device including computer usable code for work plan based access control, the computer usable code comprising:
  computer usable code for determining, at an application executing using a processor and a memory, for a portion of the work plan, a first physical space, wherein access to the first physical space is used in a task in the portion;
  computer usable code for forming, at the application executing using the processor and the memory, for the portion of the work plan, a first logical grouping using the first physical space and a first plurality of virtual resources related to the first physical space, wherein the first plurality of virtual resources is used in the task in the portion;
  computer usable code for initiating at least one workflow, the at least one workflow operating to determine whether to grant the access to the first logical grouping;
  computer usable code for configuring, responsive to determining that an access permission is needed to the first physical space, a mobile device of a first user, wherein the mobile device is going to be present in the first physical space with the access permission to the first physical space for a first duration for the first user performing the task;
  computer usable code for further configuring the mobile device such that the mobile device is recognized to provide access to the first plurality of virtual resources for the first duration for the first user performing the task;
  computer usable code for triggering a second workflow, responsive to determining that the portion is required longer than the first duration, to modify the access permission on the mobile device; and
  computer usable code for progressively changing the access permission on the mobile device, comprising:
    computer usable code for revoking, responsive to an indication of closing of the portion, the access to the first logical grouping for the first duration for the first user performing the task;
    computer usable code for determining, responsive to the closing of the portion, for a second portion of the work plan, a second logical grouping of a second physical space and a second plurality of virtual resources related to the second physical space, wherein the second physical space and the second plurality of virtual resources are used in a second task in the second portion, and wherein access to at least one of the first plurality of virtual resources is maintained during the revoking and included in the second plurality of virtual resources; and
    computer usable code for configuring, responsive to granting access to the second physical space, the access permission on the mobile device of the first user to access the second logical grouping for a second duration of the second task.

8. The non-transitory computer usable program product of claim 7, wherein the at least one workflow further operates to determine whether to grant the access to the virtual resource.

9. The non-transitory computer usable program product of claim 7, wherein the virtual resource is a part of a Building Information Model (BIM), wherein the BIM models a component of the physical space.

10. The non-transitory computer usable program product of claim 7, wherein the computer usable code is stored in a computer readable storage medium in a data processing system, and wherein the computer usable code is transferred over a network from a remote data processing system.

11. The non-transitory computer usable program product of claim 7, wherein the computer usable code is stored in a computer readable storage medium in a server data processing system, and wherein the computer usable code is downloaded over a network to a remote data processing system for use in a computer readable storage medium associated with the remote data processing system.

12. A data processing system for work plan based access control, the data processing system comprising:
  a storage device including a storage medium, wherein the storage device stores computer usable program code; and
  a processor, wherein the processor executes the computer usable program code, and wherein the computer usable program code comprises:
    computer usable code for determining, at an application executing using a processor and a memory, for a portion of the work plan, a first physical space, wherein access to the first physical space is used in a task in the portion;
    computer usable code for forming, at the application executing using the processor and the memory, for the portion of the work plan, a first logical grouping using the first physical space and a first plurality of virtual resources related to the first physical space, wherein the first plurality of virtual resources is used in the task in the portion;
    computer usable code for initiating at least one workflow, the at least one workflow operating to determine whether to grant the access to the first logical grouping;
    computer usable code for configuring, responsive to determining that an access permission is needed to the first physical space, a mobile device of a first user, wherein the mobile device is going to be present in the first physical space with the access permission to the first physical space for a first duration for the first user performing the task;
    computer usable code for further configuring the mobile device such that the mobile device is recognized to provide access to the first plurality of virtual resources for the first duration for the first user performing the task;
    computer usable code for triggering a second workflow, responsive to determining that the portion is required longer than the first duration, to modify the access permission on the mobile device; and
    computer usable code for progressively changing the access permission on the mobile device, comprising:
      computer usable code for revoking, responsive to an indication of closing of the portion, the access to the first logical grouping for the first duration for the first user performing the task;
      computer usable code for determining, responsive to the closing of the portion, for a second portion of the work plan, a second logical grouping of a second physical space and a second plurality of virtual resources related to the second physical space, wherein the second physical space and the second plurality of virtual resources are used in a second task in the second portion, and wherein access to at least one of the first plurality of virtual resources is maintained during the revoking and included in the second plurality of virtual resources; and computer usable code for configuring, responsive to granting access to the second physical space, the access permission on the mobile device of the first user to access the second logical grouping for a second duration of the second task.

* * * * *